United States Patent
El-Bakry et al.

(10) Patent No.: US 8,015,876 B2
(45) Date of Patent: Sep. 13, 2011

(54) METHOD AND APPARATUS FOR MEASURING THE STRUCTURAL INTEGRITY OF A SAFE-LIFE AIRCRAFT COMPONENT

(75) Inventors: Murad El-Bakry, Bristol (GB); Kathryn Jane Atherton, Bristol (GB); Christophe Armand Nicolas Paget, Bristol (GB)

(73) Assignee: Airbus Operations Limited, Bristol (GB)

(*) Notice: Subject to any disclaimer, the term of this patent is extended or adjusted under 35 U.S.C. 154(b) by 914 days.

(21) Appl. No.: 11/428,976

(22) Filed: Jul. 6, 2006

(65) Prior Publication Data

US 2007/0095138 A1   May 3, 2007

(30) Foreign Application Priority Data

Jul. 6, 2005 (GB) .................... 0513901.9

(51) Int. Cl.
*G01N 29/04* (2006.01)
(52) U.S. Cl. ............ 73/587; 73/597; 73/598; 73/602
(58) Field of Classification Search .............. 73/587, 73/597, 598, 602; 702/39, 188, 189, 196, 702/34, 42, 43, 197
See application file for complete search history.

(56) References Cited

U.S. PATENT DOCUMENTS

| 4,297,885 | A | * | 11/1981 | Hein et al. ............... 73/587 |
| 4,524,620 | A | * | 6/1985 | Wright et al. ............... 73/587 |
| 5,065,630 | A | * | 11/1991 | Hadcock et al. .......... 73/802 |
| 5,483,833 | A | * | 1/1996 | Dickens et al. ........... 73/583 |
| 5,962,252 | A | * | 10/1999 | McFarland et al. ......... 435/34 |
| 6,125,333 | A | * | 9/2000 | Pun ...................... 702/42 |
| 6,173,613 | B1 | * | 1/2001 | Dunegan ................ 73/587 |
| 6,276,208 | B1 | * | 8/2001 | Kuhnicke et al. .......... 73/587 |
| 6,360,608 | B1 | * | 3/2002 | Dunegan ................ 73/587 |
| 6,693,548 | B2 | * | 2/2004 | Boyce et al. ............. 340/657 |
| 6,826,982 | B2 | | 12/2004 | O'Brien |
| 7,193,530 | B2 | * | 3/2007 | Nance .................. 340/960 |

(Continued)

FOREIGN PATENT DOCUMENTS
WO     01/94934 A1    12/2001

OTHER PUBLICATIONS

Bychkov et al., "Acoustic-Emission Study of Damage Accumulation During Alternating Low-Cycle Loading at Elevated Temperature" Nov. 1983. pp. 1532-1534. vol. 15, No. 11.

(Continued)

*Primary Examiner* — Jacques M Saint Surin
(74) *Attorney, Agent, or Firm* — Lowe, Hauptman, Ham & Berner, LLP

(57) ABSTRACT

The structural integrity of a safe-life aircraft component on an aircraft is measured and assessed by a processing unit. The component includes a load-bearing metal element that is free from cracks. In the method, acoustic emissions generated in the metal element are converted into electronic signals. The acoustic emissions converted include relevant acoustic emissions resulting from changes in the structure of the element that make the element more susceptible to the formation of cracks. The electronic signals are set to a processing unit. The processing unit processes over time the signals in conjunction with stored reference data that allows a measure of the structural integrity to be made. Information providing a measure of the structural integrity of the aircraft component is outputted. Thus, deterioration of the structure of the component can be detected and monitored before a crack occurs.

59 Claims, 5 Drawing Sheets

U.S. PATENT DOCUMENTS

| | | | | |
|---|---|---|---|---|
| 7,387,033 | B2 * | 6/2008 | Qing et al. | 73/862.046 |
| 7,413,919 | B2 * | 8/2008 | Qing et al. | 438/48 |
| 2007/0095138 | A1 * | 5/2007 | El-Bakry et al. | 73/583 |

OTHER PUBLICATIONS

Rogers "Structural and Engineering Monitoring by Acoustic Emission Methods—Fundamentals and Applications" Sep. 2001. pp. 31-35.

Huang et al. "Using Acoustic Emission in Fatigue and Fracture Materials Research" Nov. 1998. vol. 50, No. 11. pp. 1-13.

Kim "Characterization of Mechanical Properties by Acoustic Emission Using an Energy Criterion" 1975. pp. 591-596.

Harris et al. "Continuous Monitoring of Fatigue-crack Growth by Acoustic-emission Techniques" May 1973. pp. 71-81.

* cited by examiner

METHOD AND APPARATUS FOR MEASURING THE STRUCTURAL INTEGRITY OF A SAFE-LIFE AIRCRAFT COMPONENT

RELATED APPLICATIONS

The present application is based on, and claims priority from, UK Patent Application Number 0513901.9, filed Jul. 6, 2005, the disclosure of which is hereby incorporated by reference herein in its entirety.

BACKGROUND

The present invention relates to measuring or assessing the structural integrity of, the structural change in, or damage to, an aircraft component, and in particular to a load bearing metal element used as a safe-life component on an aircraft.

A safe-life component on an aircraft must be structurally safe throughout the entire working life of the component and in particular must not be allowed to develop cracks that could prejudice such structural safety, to yield to any non-negligible degree or to fail in any other way. (It will be understood that superficial micro-cracking on the surface of a safe-life component does not in itself constitute cracking that could prejudice structural safety. As such in the context of the present invention it will be understood that a component may be considered as being "crack-free" or "free from cracks", despite the component having superficial micro-cracking, provided that such micro-cracking is of a nature that does not in itself prejudice structural safety.)

Safe-life components can be distinguished from "fail-safe" components, which are designed to be able to sustain damage or be allowed to develop cracks, to yield, or even fail, without presenting an unacceptable short-term safety risk. Fail-safe components may for example be able to sustain damage or partial failure without significantly affecting the ability of the component to perform its function, or if so significantly affected there are other components that are able to act as a back-up. For example, the failure of a safe-life component during service would be at risk of prejudicing safety to an unacceptable degree even in the short-term, whereas failure of a fail-safe component would be able to be tolerated until the next available opportunity for maintenance. Operators of aircraft typically have to conduct scheduled inspections of safe-life components at fixed intervals. Also, a safe-life component generally has to be replaced after a certain length of service so as to manage effectively the risk of failure of such a component in service. In view of the unacceptability of failure of a safe-life component during service, safe-life components are typically withdrawn far in advance of the possible maximum length of useable service and consequently the maximum length of service for safe-life components is typically conservatively short. Whilst such short lifetimes of safe-life components is wasteful, there is currently no means of effectively reducing the risk that a particular safe-life aircraft component will fail significantly in advance of the average lifetime. The present invention has been made in recognition that there has been a lack of effective means of assessing the structural integrity of such safe-life components once in use.

Various methods exist for measuring the structural integrity of a load bearing metal element including, for example, non-destructive testing methods (such as by means of X-ray radiography) and microscope analysis. Such techniques with their limited accuracy and other disadvantages, have limited application in relation to assessing and monitoring the structural integrity of a safe-life component. The present invention concerns the use of acoustic emission monitoring to assess the structural integrity of a safe-life aircraft component.

A method for detecting and monitoring fractures in a structure by monitoring acoustic emissions is disclosed in International Patent Application No. PCT/GB01/02213 (published under No. WO 01/94934) which is incorporated herein by reference in its entirety. The method of detecting and monitoring for damage in metal structures as described in WO 01/94934 relies on monitoring acoustic emissions caused by fractures or cracks. Such a method is therefore of no use when monitoring for damage in safe-life aircraft components, because it is a requirement that such components are free from cracks.

An experiment concerning the use of acoustic emissions to check the condition of a cylindrical specimen at high temperature is described in a paper entitled "Acoustic-Emission Study of Damage Accumulation During Alternating Load-Cycle Loading at Elevated Temperature" by N. G. Bychkov et al which is translated from "Problemy Prochnosti, No. 11, pp. 21-23, November 1983" of the "Central Institute of Aircraft Engine Design, Moscow and which is incorporated herein by reference in its entirety. The teaching of that paper relates primarily to monitoring of crack growth, and predicting imminent fracture in high temperature samples, in an experimental/laboratory setting utilizing a waveguide to carry acoustic emissions from the sample, which is housed in a furnace, to an acoustic emission transducer. As mentioned above, the present invention is concerned with structural health monitoring of safe-life components on an aircraft, such components being required to be free from cracks.

SUMMARY

It is an aim of the present invention to provide an improved method of measuring the structural integrity of a load bearing aircraft component for example by providing a method of measuring the structural integrity of a safe-life aircraft component made from a metal element.

The present invention provides a method of measuring the structural integrity of a safe-life aircraft component comprising a load-bearing metal element, the method including the steps of:

converting acoustic emissions generated in the metal element into electronic signals, the acoustic emissions converted including "relevant acoustic emissions", namely acoustic emissions resulting from changes in the structure of the element that make the element more susceptible to the formation of cracks, sending the electronic signals to a processing unit, and, with the processing unit, processing over time the signals in conjunction with stored reference data that allows a measure of the structural integrity to be made from the signals sent to the processing unit, and outputting information providing a measure of the structural integrity of the aircraft component. Thus the method of the invention may be implemented to monitor for damage to, changes in, or deterioration of, the structure of the metal element before a crack occurs.

It will of course be appreciated that the electronic signals may be modified before being received by the processor. For example, the electronic signals may be converted from analogue to digital signals.

The step of processing the signals may include assessing whether one or more signals correspond to a "relevant acoustic emission" and preferably includes assessing which of each acoustic emission signal corresponds to a "relevant acoustic emission". For example, acoustic emissions that conform to pre-set criteria characterising a relevant acoustic emission may be deemed as corresponding to a relevant acoustic emission. Acoustic emission signals assessed as not corresponding to a relevant acoustic emission are preferably discarded by the processing unit, for example being ignored for the purposes of performing the method of the invention as defined herein. The step of assessing whether an acoustic emission may be deemed as corresponding to a relevant acoustic emission may include assessing whether the acoustic emission is one that is typical of an acoustic emission resulting from changes in the structure of the element at a scale of the order of a few microns or less.

The step of processing the signals advantageously includes calculating, and preferably additionally monitoring, the cumulative number of relevant acoustic emissions over a period, for example a pre-set period. The period may for example be a period of time measured from the first time the method is performed on the metal element. The period of time may exclude times during which the metal element is not being subjected to loading of the type likely to change or affect the structural integrity of the aircraft component. The period may alternatively be measured as a number of nominal cycles of fatigue loading. The period may be measured as a number of actual cycles of fatigue loading (the cycles being detected by an appropriately arranged sensing system). Such a calculation may be performed without assessing the location of the acoustic emissions. In contrast to methods of the prior art (such as that described in WO 01/94934), the present invention is able to measure the global structural properties of an element without first having to determine the locations of the source of the acoustic emissions in the element. It will of course be appreciated that location information may additionally be used in the performance of a method according to the present invention.

The step of processing the signals may include a step of effectively comparing the cumulative number of relevant acoustic emissions with a pre-set threshold. The threshold may for example be set such that above the threshold there is a given probability of a crack having occurred in the element. Once the threshold is exceeded the method may include taking further action, for example, remedial action.

The step of processing the signals may include additionally or alternatively include a step of calculating, and preferably additionally monitoring, the number of relevant acoustic emissions over a pre-set period. Again, the pre-set period may be a pre-set period of time or alternatively a pre-set period of nominal loading cycles. The pre-set period is preferably short enough to be short relative to the expected lifetime of the element, but long enough that the number of relevant acoustic emissions detected during said period can be considered as not being significantly affected by the inherently noisy and seemingly random nature of the rate of emission of relevant acoustic emissions. The pre-set period may be a constant period of time in the past as measured from the instant at which the step of processing the signals is performed. Again, the number of relevant acoustic emissions over the period may be compared to a threshold and if the threshold is exceeded appropriate further action may be taken.

The step of processing the signals may include performing calculations using a measure of the size of a relevant acoustic emission, for example, the peak amplitude, the average signal level, the rise time of the emission, the energy and/or the duration of the emission. The measure of the size of a relevant acoustic emission may be used to weight the relevance of the relevant acoustic emission as compared to other relevant acoustic emissions of a different size.

The method may include a step of detecting acoustic emissions at different frequencies and/or calculating a characteristic relating thereto. The step of processing the signals may for example include taking account of the frequencies of the respective relevant acoustic emissions. The frequency of the signal used in such a step may for example be the fundamental frequency, or a frequency equal to an integer multiple of the fundamental frequency.

The step of processing the signals may include a step of calculating a characteristic relating to (for example being equal to) the rate of relevant acoustic emissions.

The step of processing the signals may include a step of calculating a characteristic relating to (for example being equal to) the spatial density of relevant acoustic emissions.

The step of processing the signals may include a step of calculating a characteristic relating to (for example being equal to) an indication of the timing or order of successive relevant acoustic emissions.

The step of processing the signals may include weighting any of the parameters or characteristics mentioned herein according to the size of the relevant acoustic emissions.

The step of processing signals may include calculating one or more proximity characteristics that provide an indication of the proximity of the sources of respective relevant acoustic emissions relative to each other. Such proximity characteristics may simply be in the form of location co-ordinates. Such proximity characteristics may be associated, or embedded with, any of the other parameters or characteristics mentioned herein. Thus, the step of processing the signals may include a step of taking into account an indication of the proximity of the sources of the respective relevant acoustic emissions relevant to each other.

The step of processing the signals may include a step of differentiating a first variable with respect to a second variable. For example, the differential calculated may be a measure of the rate of change of the cumulative number of relevant acoustic emissions.

The step of processing the signals may include a step of integrating a first variable over a range defined by means of a second variable. For example, the step of processing the signals may include a step of calculating a characteristic relating to (for example being equal to) the integral of the cumulative number of relevant acoustic emissions with respect to a pre-set period.

The step of processing the signals may include calculating characteristics of notional graphs (such characteristics for example including differentials or integrals), the notional graphs having at least two axes dependent on any two independent variables representative of any of the parameters or characteristics mentioned herein. It will be understood of course that the characteristics of the notional graphs may be calculated either with or without creating a physical representation (such as a drawing for example) of the graph.

The step of processing the signals may include using non-acoustic data. Such non-acoustic data may include a measure of stress and/or strain in relation to the metal element as measured by for example one or more strain gauges or other sensors associated with the metal element. The non-acoustic data may alternatively or additionally include a measure of temperature. The method may of course combine any of the above-described steps of processing the signals. For example, both characteristics relating to the cumulative number of relevant acoustic emissions, and to the number of relevant acoustic emissions over a pre-set period of time may be calculated and monitored. In such a case, the method may monitor whether the two characteristics meet given criteria, such as each characteristic exceeding a respective given threshold. In the event that such criteria are met the method may include taking further action. More generally, the step of processing the signals may include a step of calculating a plurality of characteristics selected from any of the characteristics or parameters mentioned herein. The plurality of characteristics so calculated may then be compared with pre-set criteria, the criteria being selected such that once met the aircraft component is deemed to be in need of further, for example remedial, action. The step of calculating a plurality of different characteristics may for example comprise performing two or more of steps (a) to (n), where steps (a) to (n) are as follows:

(a) assessing whether one or more signals correspond to a "relevant acoustic emission", (b) assessing which of each acoustic emission signal corresponds to a "relevant acoustic emission", (c) calculating the cumulative number of relevant acoustic emissions over a period, (d) assessing the location of the acoustic emissions, (e) effectively comparing the cumulative number of relevant acoustic emissions with a pre-set threshold, (f) calculating the number of relevant acoustic emissions over a pre-set period, (g) using a measure of the size of a relevant acoustic emission, (h) detecting acoustic emissions at different frequencies, (i) calculating a characteristic relating to the rate of relevant acoustic emissions, (j) calculating a characteristic relating to the spatial density of relevant acoustic emissions, (k) calculating a characteristic relating to the timing or order of successive relevant acoustic emissions, (l) calculating one or more proximity characteristics that provide an indication of the proximity of the sources of respective relevant acoustic emissions relative to each other, (m) calculating a characteristic relating to the integral of the cumulative number of relevant acoustic emissions with respect to a pre-set period, and (n) calculating characteristics of notional graphs, the notional graphs having at least two axes dependent on any two independent variables representative of any of the parameters or characteristics mentioned in steps (a) to (m) above.

The method may of course also include implementing the further action. In such a case the step of implementing of the further action may of course replace the step of deeming of the need for the further action.

Above it is stated that further action may be taken, or may be deemed to be in need of being taken, if a threshold is exceeded or if certain criteria are met. The further action may simply be to provide an indication, electronic or otherwise, that indicates that the threshold has been exceeded or the criteria have been met, as is appropriate. Such an indication may be arranged to be arranged to be discoverable during maintenance procedures relating to the aircraft component. The further action may comprise testing the aircraft component or a part thereof, for example the metal element with other means or performing such tests, if already routinely performed, more often. The further action may include further non-destructive testing to obtain an assessment of the structural integrity of the metal element. Preferably, such non-destructive testing is not dependent on the monitoring of acoustic emissions.

The further actions may be in the form of physical activity affecting the use or function of the aircraft component. For example, the further action may comprise replacing the aircraft component, or a part thereof.

The further action may include a step of repairing the aircraft component or a part thereof.

The criteria mentioned above may be pre-selected by means of a method including performing empirical testing, for example by means of a series of experiments using test rigs. The criteria may additionally or alternatively be pre-selected by means of a method including performing computer modelling of the aircraft component.

It will be appreciated that the thresholds and criteria mentioned herein may form the totality or part of the stored reference data that is used when processing the signals to provide the information outputted by the processing unit that provides the measure of the structural integrity of the element.

The information outputted may include information in any of a wide variety of forms. The outputted information may include data providing a measure of the structural integrity of the element. The outputted information may comprise data providing an assessment of the structural change in, or damage to, the aircraft component. The information may be in the form of a prediction, for example of the likeliness of a crack forming. The information could for example be in the form of a prediction of the mean time left before a crack will occur. The outputted information may include an indication of the expected useable life-span of the metal element, for example by providing indications of the mean time that the element could feasibly remain in service. The information could include indications relating to the structural integrity of the element compared to those of a notional average element.

The outputted information may include information concerning the source or sources of the relevant acoustic emissions. For example, the output may include information concerning the location(s) in the element of the source or sources.

The information outputted is preferably in electronic form, for example in the form of electronic data.

A multiplicity of acoustic emission sensors may be provided in order to effect the step of converting acoustic emissions generated in the aircraft component into electronic signals. For example, the multiplicity of acoustic emission sensors may be attached to the metal element. Alternatively, the multiplicity of acoustic emission sensors may be in the form of remote sensors that are able to detect acoustic emissions without needing contact with the metal element. For example, the acoustic emission sensors may be in the form of remote laser source and detector arrangements, laser light being directed onto the surface of the metal element and reflected back to one or more detectors. Preferably, a sufficient number of sensors are provided to enable the location of the source of a relevant acoustic emission to be ascertained by triangulation techniques.

The method may be performed such that at least two of the acoustic emission sensors have a fundamental resonant frequency at a first frequency and at least two acoustic emission sensors have a fundamental resonant frequency at a second frequency, the first and second frequencies being different. Acoustic emissions at different frequencies may thereby be detected. Also, the different acoustic emission sensors may be able to provide a frequency-amplitude profile of an acoustic emission. The frequency-amplitude profile of an acoustic emission may for example be used to assist detection of relevant acoustic emissions.

The metal element may be in the form of a safety critical load-bearing element that in use is required to be free from cracks. The metal element need not be made exclusively from metals. For example, the metal element may be in the form of a metal alloy or mixture containing non-metallic materials, for example composite material additives. The metal element may be in the form of any homogeneous structure which is prone to the formation of cracks under fatigue loading, where before the formation of a crack occurs there are structural changes that cause acoustic emissions to be made. The aircraft component may be in the form of any safe-life component on an aircraft. For example the component may be a component on an aircraft landing gear. The component may be a landing gear leg. The aircraft component may be an engine pylon. The aircraft component may be a landing gear rib. The aircraft component may be an aircraft bulk head. The aircraft component will typically have an average temperature, during performance of the method, that is substantially the same as ambient temperature. The average temperature of the component may for example be less than 100° C.

The method described herein of measuring the structural integrity of an element may be in the form of a method of measuring the plasticity of such an element. Thus, the information outputted may be a measure of the plasticity of the load bearing metal element.

The methods of the invention described above include both acquisition and processing of data. The processing of the data may be performed in real-time soon after the data is acquired. Alternatively, the data may be stored for subsequent processing at a significantly later time, for example, during routine periodic maintenance of the metal element. Thus, the present invention further provides a method of acquiring data for subsequent processing, the data concerning the structural properties of a safe-life aircraft component comprising a load-bearing metal element, the method including the steps of converting acoustic emissions generated in the metal element into electronic signals, the acoustic emissions converted including "relevant acoustic emissions", namely acoustic emissions resulting from changes in the structure of the element, and storing the electronic signals as measurement data in a data store. The data so acquired may then subsequently be processed. Thus there is further provided a method of measuring the structural integrity of a safe-life aircraft component comprising load-bearing metal element, the method including the steps of acquiring measurement data, and then subsequently processing the data so acquired with a processing unit in conjunction with stored reference data that allows a measure of the structural integrity to be made from the acquired measurement data, and outputting information providing a measure of the structural integrity of the aircraft component. The measurement data so acquired may include data concerning relevant acoustic emissions, for example data produced by means of performance of the data acquisition method described immediately above.

The method according to any aspect of the invention described herein is advantageously performed a multiplicity of successive times in respect of a given metal element of an aircraft component. Preferably, the method is performed such that the structural integrity of the aircraft component is effectively continuously measured and monitored.

The present invention further provides a processing unit programmed to perform the steps performed by the processing unit of the method according to any aspect of the invention described herein.

The present invention also provides computer software, for example in the form of a computer software product, that is configured to programme a processing unit to perform the steps performed by the processing unit of the method according to any aspect of the invention described herein.

The present invention further provides computer data, for example in the form of a computer data product, containing reference data for use as the stored reference data as required by the method according to any aspect of the invention described herein.

There is also provided a kit of parts including a processing unit and a multiplicity of acoustic emission sensors, the kit of parts being able to be configured to implement the method according to any aspect of the invention described herein. The kit of parts may further include computer data as described above.

The present invention yet further provides a kit of parts including a multiplicity of acoustic emission sensors and a data storage means for the storage of measurement data for subsequent processing, the kits of parts being able to be configured to implement the method according to any aspect of the invention described herein, in which data is stored for subsequent processing.

In accordance with the present invention there is also provided an apparatus for performing the method of the invention. The apparatus advantageously includes a safe-life aircraft component comprising a load-bearing metal element, a processing unit, a multiplicity of acoustic emission sensors, and a reference data store. The apparatus is advantageously so arranged that the multiplicity of acoustic emission sensors is arranged to convert acoustic emissions generated in the metal element into electronic signals, the processing unit is arranged to receive electronic signals derived from the signals sent by the acoustic emission sensors, the reference data store includes stored reference data that allows a measure of the structural integrity of the aircraft component to be made from the signals sent to the processing unit, the processing unit is arranged to process over time the received electronic signals in conjunction with the stored reference data and to output information providing a measure of the structural integrity of the aircraft component.

The present invention also provides an apparatus for performing any aspect of the method of the invention described herein of acquiring data for subsequent processing, the apparatus including a safe-life aircraft component comprising a load-bearing metal element, a multiplicity of acoustic emission sensors, and a measurement data store. The apparatus is advantageously so arranged that the multiplicity of acoustic emission sensors is arranged to convert acoustic emissions generated in the metal element into electronic signals, and the measurement data store is arranged to receive data signals derived from the electronic signals from the acoustic emission sensors and to store those signals as measurement data in the measurement data store.

The term structural integrity is used herein in relation to the structure of the metal element of the aircraft component on the same scale as the size of cracks which are deemed to be too large for safety reasons on a safe-life structure. The integrity of a structure may be defined by a measure of the likelihood of the structure containing a crack. The structural integrity of a structure may be defined by a measure of the likelihood of a crack being formed in the structure, for example after certain criteria have been satisfied (such as a certain time having elapsed and/or certain loading conditions having been satisfied). The structural integrity of a structure may be defined by a measure of the amount of changes in the submicrostructure that contribute to the formation of cracks. The term crack as used herein is intended to cover cracks on a microscopic scale, that is cracks that can, once the relevant cross-section is made visible, be identified with the aid of a microscope. The term "crack" as used herein is also intended to cover cracks that are able to be readily detectable via the use of standard non-destructive detection techniques, such as eddy current testing. Such techniques reliably enable detection of cracks having a length of over 0.5 mm. It will of course be understood that the present invention advantageously enables detection of cracks and crack formation where the size of the crack is such that the crack would be undetectable using current non-destructive testing techniques. Moreover the invention advantageously enables measurements of the structural integrity of an aircraft component to be made before cracks form. It will also be understood that micro-cracks, in particular micro-cracking on the surface of a metal load bearing element, is not necessarily either a crack that significantly prejudices safety or one that needs to be detected by means of the present invention. However, it should be noted that the present invention may facilitate the detection of submicrostructure changes that contribute to the eventual formation of cracks and that therefore affect the structural integrity of a safe-life aircraft component.

BRIEF DESCRIPTION OF THE DRAWINGS

By way of example, an embodiment of the present invention will now be described with reference to the accompanying drawings, of which.

DETAILED DESCRIPTION OF EMBODIMENTS

Experiments were carried out to test the feasibility of the embodiment of the present invention. As the embodiment of the present invention is based closely on the experiments that were carried out, one of those experiments will now be described in further detail.

Figure 1:
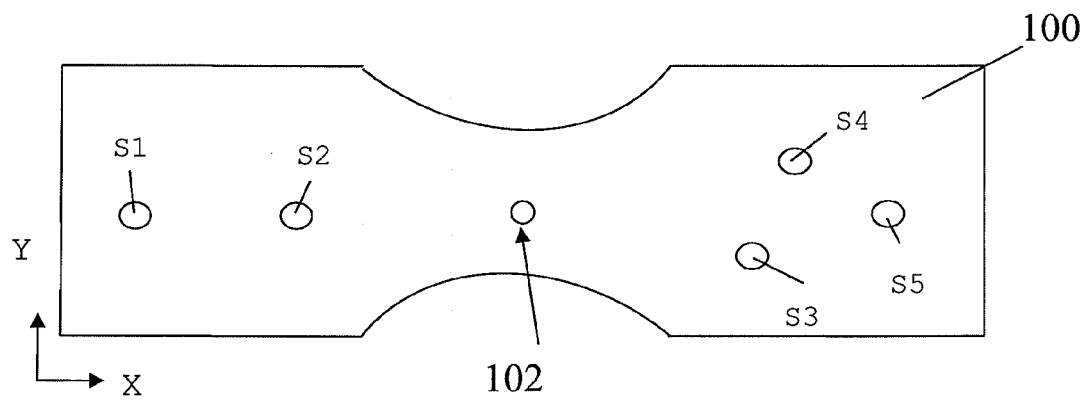
FIG. 1 shows in plan view a test element with acoustic sensors attached thereto.

The aim of the experiment was to evaluate the effectiveness of an acoustic emission measurement system in detecting early damage in a test element. Specimen test elements 100 were tested in fatigue, a schematic diagram of which is shown in FIG. 1. The specimens 100 were made of hardened 300M steel, and included a hole 102 in their middle. The specimens were 350 mm (in the x-direction) by 70 mm (in the y-direction) by 6 mm with a hole 4.4 mm in diameter. The width (in the y-direction) in the waisted middle of the specimens was 26 mm. The specimens were instrumented with five sensors S1-S5. The sensor coordinates are given in Table 1 below:

TABLE 1

Sensor coordinates

| S1 | S2 | S3 | S4 | S5 |
|---|---|---|---|---|
| x = 80, y = 35 | x = 130, y = 35 | x = 230, y = 30 | x = 245, y = 45 | x = 270, y = 35 |

The role of sensors S1 and S5 was to enable the filtering out of waves originating from the clamping device used to hold the specimen 100. Sensors S2, S3 and S4 monitor the acoustic emissions coming from the hole and its vicinity. The hole was introduced to ensure the location of damage as well as to reduce the scatter factor of the failure of the specimens.

The resonant frequency of the sensors and their pre-amplifiers was 600 KHz. The sensors were surface bonded to the specimens with a non corrosive silicon rubber. Each pre-amplifier provided an amplification of 40 dB and a narrow band filtering of the sensor output. The acoustic emission measurement system was connected to the pre-amplifiers via coaxial cables. The load applied was read by the acoustic emission measurement system using one of its non acoustic data inputs via a coaxial cable.

Figure 2:
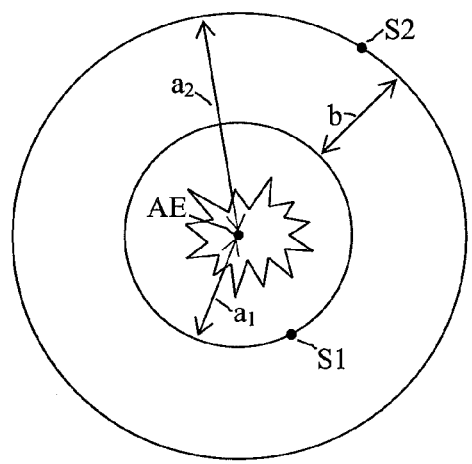
FIG. 2 is a schematic diagram showing a test acoustic emission being caused on the test element.

Before fatiguing of the specimen was commenced the sensors S1 to S5 were calibrated. This operation consisted of verifying that each sensor was in good functioning order and that the sensor was properly bonded to the specimen. The calibration procedure also included a step of making acoustic emission measurements and evaluating the group velocity throughout the specimen. These group velocity measurements were used later to ascertain the location of the acoustic emission sources. Pencil lead was broken (Hsu-Nielson source) on the specimen surface, the acoustic emission measurement system measuring the time difference of flight, $\Delta T_i$, namely the travel time difference from the first hit sensor to the ith hit sensor. With reference to FIG. 2, if the separation between the acoustic emission AE and the first sensor S1 is distance a, and the separation between the acoustic emission AE and the second sensor S2 is distance $a_2$, then the velocity is calculated as $b/\Delta T$, where $b=a_2-a_1$, and $\Delta T$ is the time between the acoustic emission being detected at sensor S1 and the acoustic emission being detected at sensor S2.

Figure 3:
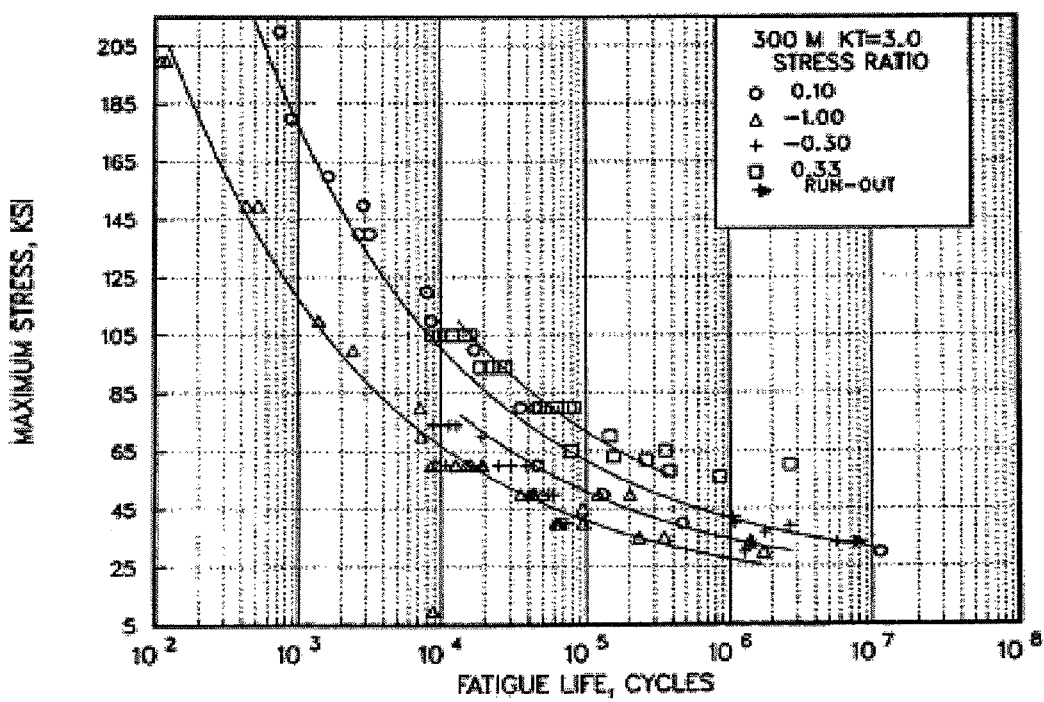
FIG. 3 is a graph showing the S-N curves for the material from which the test element is made.

The measured velocity was approximately 5 km/s, which is in agreement with the theoretical value given by the dispersion curves. The specimen 1 was then subjected to loading in the form of a sinusoidal cycle of constant amplitude 13 Hz frequency. FIG. 3 shows the S-N curves for the 300M material used to determine the maximum stress level to apply on the specimen to reach a specific load cycle for a given stress ratio. The loading was applied in a series of 15 loading runs, the loading profile applied to a particular specimen being as shown in Table 2, set out below:

TABLE 2

Details of profile of loading applied to a specimen

| Loading Run | Peak Load | Min. Load | No. of cycles | Cumulative cycles at end of run |
|---|---|---|---|---|
| 1 | 31.5 KN | 3.1 KN | 335,960 | 335,960 |
| 2 | 31.5 KN | 3.1 KN | 166,670 | 502,630 |
| 3 | 31.5 KN | 3.1 KN | 272,265 | 774,895 |
| 4 | 31.5 KN | 3.1 KN | 432,005 | 1,206,900 |
| 5 | 37.4 KN | 3.1 KN | 191,050 | 1,397,950 |
| 6 | 37.4 KN | 3.7 KN | 146,650 | 1,544,600 |
| 7 | 37.4 KN | 3.4 KN | 150,010 | 1,694,610 |
| 8 | 42 KN | 4.3 KN | 220,000 | 1,914,610 |
| 9 | 42 KN | 4.3 KN | 230,000 | 2,144,610 |
| 10 | 42 KN | 4.3 KN | 209,990 | 2,354,600 |
| 11 | 42 KN | 4.3 KN | 90,010 | 2,444,610 |
| 12 | 42 KN | 4.3 KN | 220,160 | 2,664,770 |
| 13 | 42 KN | 4.3 KN | 190,090 | 2,854,860 |
| 14a | 52.5 KN | 5.2 KN | 59,740 | 2,914,600 |
| 14b | 21.2 KN | 2.1 KN | 80,950 | 2,995,550 |
| 15a | 26 KN | 2.6 KN | 39,050 | 3,034,600 |
| 15b | 31.5 KN | 3.1 KN | 38,410 | 3,073,010 |

The acoustic emission measurement system was able to measure the load applied in the fatigue test by means of non-acoustic measurements. During the experiment, the specimen was inspected for cracks after each run using both a microscope and NDT (Eddy Current) techniques. Acoustic emissions detected by the acoustic emission measurement system over threshold amplitude were measured and counted.

Figure 4:
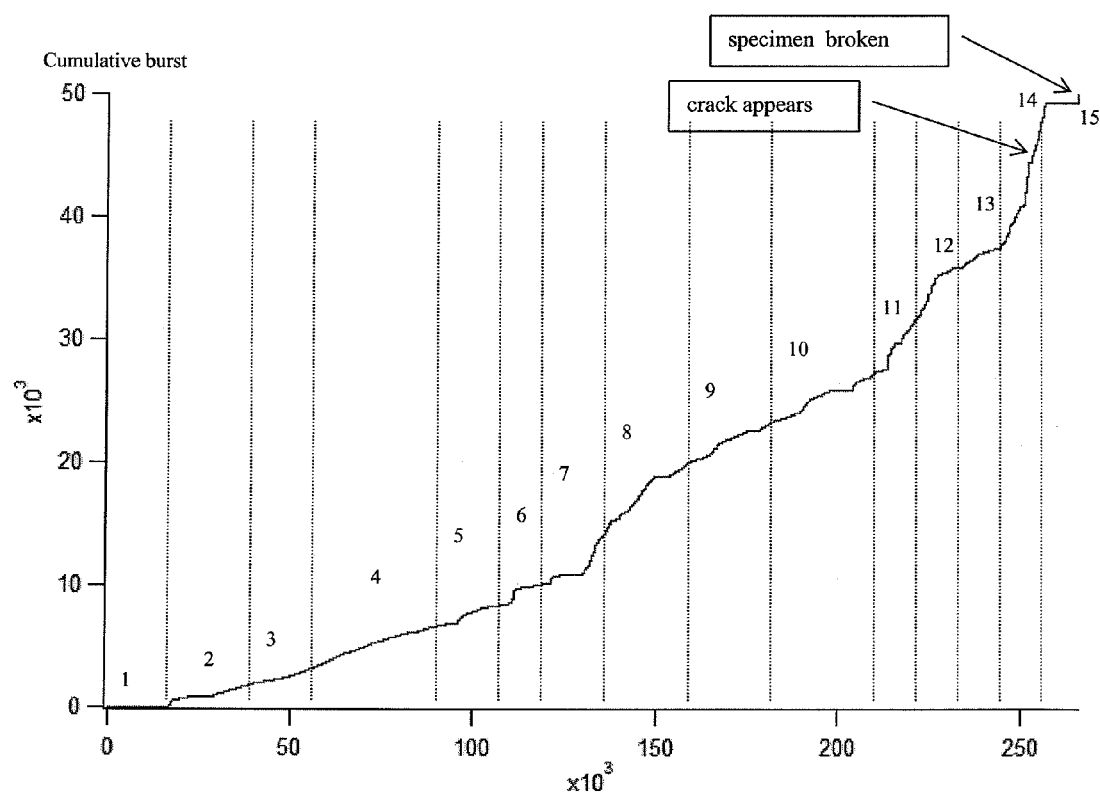
FIG. 4 is a graph showing the cumulative number of acoustic emissions detected in the test element over time.
Figure 5:
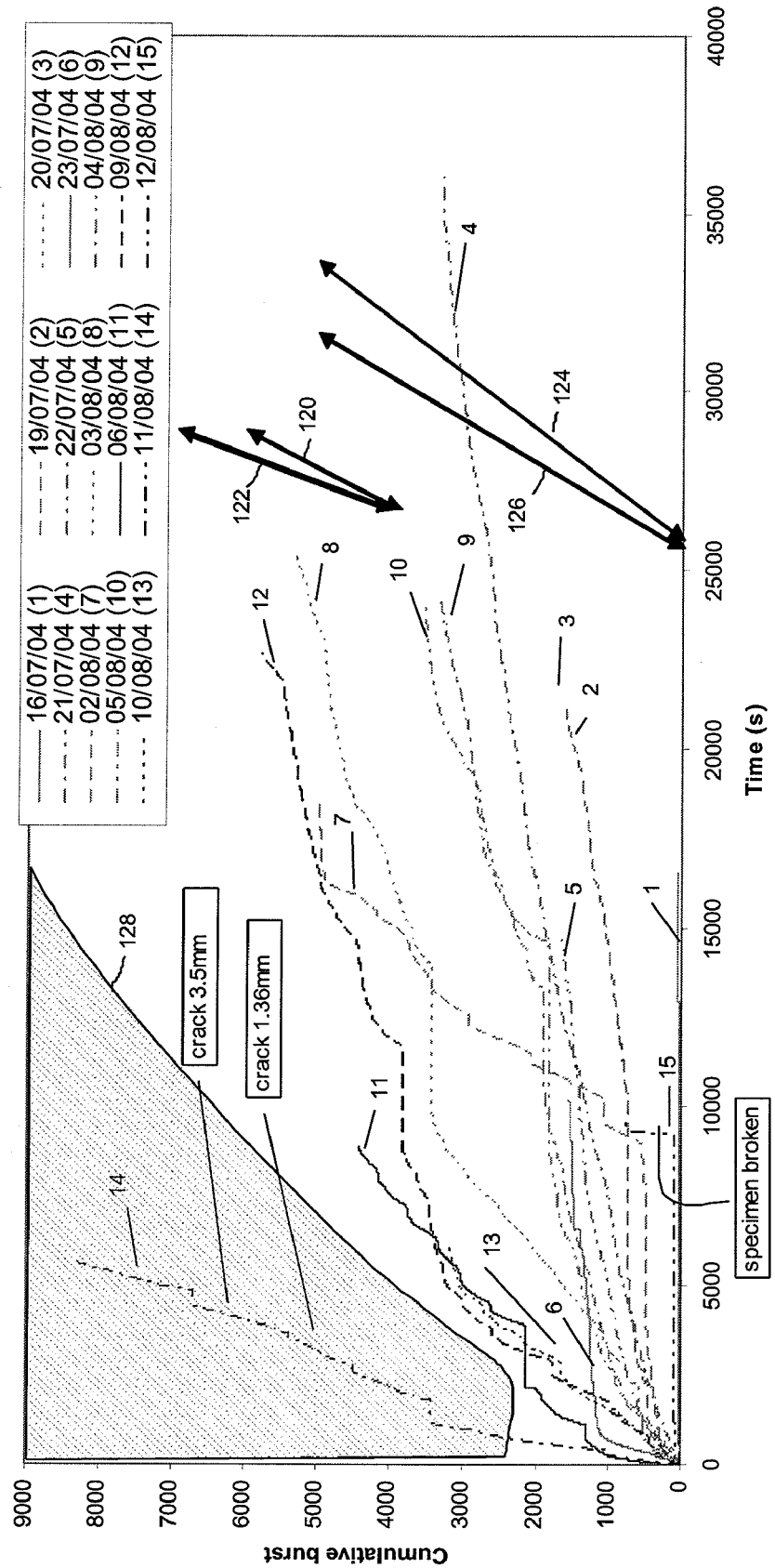
FIG. 5 is a graph showing the number of acoustic emissions detected in the test element over time for 15 consecutive runs.

FIG. 4 illustrates a graph showing the cumulate burst count on the y-axis against time (that is time during loading, the time between runs being ignored) on the x-axis. The x-axis of the graph of FIG. 4 is divided into 15 segments, each segment representing a load run, so that the single curve on the graph represents the cumulative burst count and time passing as measured from the start of the first load run (run 1). FIG. 5 also shows the cumulative burst count against time for the same data as that represented by FIG. 4, but in FIG. 5, there are 15 separate cumulative burst curves, one for each loading run, the curves showing the cumulative burst count and time passed as measured from the start of the load run for that curve.

As can be seen, the specimen was loaded at various load levels, from 31.5 KN to 52.5KN. A crack of length of 1.5 mm was observed as having been initiated during load run 14, that is after about 2.9 million cycles.

During the earlier runs, the gradient of the curves of FIGS. 4 and 5 is about 0.1-0.2 burst/s. The specimen generated a gradient about 0.1 burst/s between 0.3 million cycles and 1.43 million cycles corresponding to zones 2 to 5. The gradient increased to 0.2 burst/s between 1.43 million cycles and 2.13 million cycles corresponding to zones 8 to 10. The gradient further increased to 0.3 burst/s between 2.4 million cycles and 2.8 million cycles corresponding to zones 11 to 13. A significant shift in gradient (0.6 burst/s) was noticed between 2.86 million cycles and 2.93 million cycles corresponding to the load run (zone 14) where the crack was detected by a microscope and also by using NDT (eddy current) techniques. It will also be noted that the gradient dropped to almost zero immediately before the failure (zone 15) of the specimen.

As a result of the experiments that have been conducted, a method of monitoring the structural integrity of landing gear for an aircraft has been proposed. The method and the apparatus for implementing this proposal will now be described with reference to FIG. 6, which shows a block diagram illustrating the function of the proposed embodiment.

Figure 6:
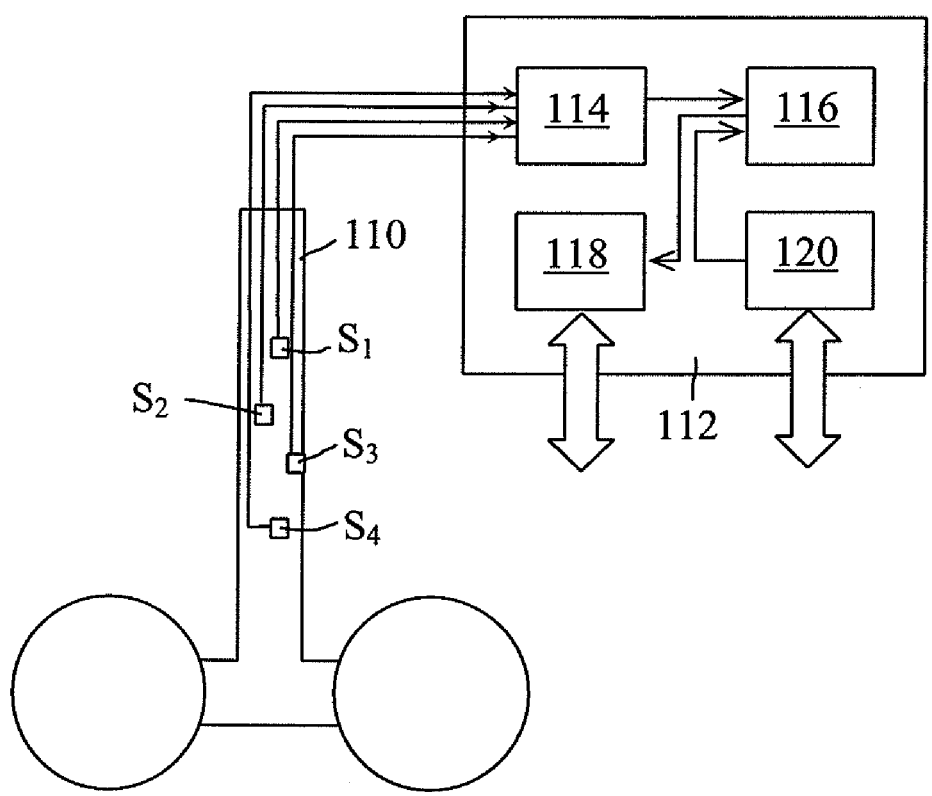
FIG. 6 is a schematic diagram showing apparatus for assessing the structural integrity of a landing gear leg according to the embodiment.

FIG. 6 shows a landing gear leg 110, in which there are embedded various acoustic emission sensors, of which only four are shown, S1-S4. Outputs from these sensors are fed via analogue to digital converters (not shown) to an acoustic emission measuring system 112. The signals from the sensors S1-S4 are received at a comparator/filter system 114, which assesses whether the magnitude and frequency of the acoustic emissions received from the sensors are within preset criteria so as to be deemed as acoustic emissions (hereinafter "significant acoustic emissions") resulting from changes within the microscopic structure of the landing gear 110, as opposed to acoustic emissions resulting from other sources. The parameters defining any significant acoustic emission are then extracted for use in analyzing the structural integrity of the metal load bearing structure of the landing gear leg. The sensors and electronic equipment used to detect and analyse acoustic emissions are well known in relation to monitoring of cracks in metals and such apparatus may be used to implement the present embodiment. One such apparatus is described in WO 01/94934, the contents of which (in particular the contents concerning the apparatus and methods used to detect and analyse acoustic emissions as described in that document with reference to the drawings of that document) are incorporated herein by reference thereto.

The apparatus of the invention is used to make an assessment of the structural integrity of the landing gear leg, over time, by means of various methods of analysis of the measure of cumulative bursts over time. In use, a processor 116 of the measurement system 112 receives data from the comparator/filter 114 concerning extracted parameters defining the acoustic emissions judged by the comparator/filter 114 as being significant acoustic emissions. This data is then analysed in consideration of data stored in a memory store 120 that allows the processor 116 to effectively compare the real-time data with data stored in the memory 120 so that statistically valid conclusions can be drawn concerning the structural integrity of the landing gear 110. The processed data and results are stored in a further memory store 118 for downloading during routine maintenance of the aircraft.

The method can be considered as plotting graphs similar to that shown in FIGS. 4 and 5 and analyzing various characteristics of such graphs. As has been established by experiment, there appear to be many ways in which the conditions that facilitate crack formation can be correlated to data extracted from measuring significant acoustic emissions. Indications of the structural integrity are provided by means of comparing the acoustic emissions data retrieved in use concerning the landing gear with a variety of thresholds and criteria that have been pre-set by means of prior experimentation and/or mathematical modelling. The criteria against which the structural integrity of the landing gear is compared, in this embodiment, consist of monitoring the following:

the absolute cumulative burst,
the number of bursts over a range of different time periods,
the burst rate,
the integral of cumulative bursts over time,
the above parameters when weighted by burst peak amplitude (so that more energetic acoustic emissions are given more weight than less energetic emissions), and
the above parameters when considered over time when grouped by the activity of the aircraft.

In each case, the data analysed is compared against the stored reference data and a result is issued with an associated statistical probability. For example, the result might be in the form that the data recorded indicates that 1% of landing gears having the same data would be beyond 75% of the working life of the gear, and that 0.1% of landing gear having the same data would be beyond 80% of the working life of the landing gear. The result might also be in a form that states that 1% of landing gear having the same data would be beyond 23% of the expected time till first crack is detected, and that 0.1% of landing gear having the same data would be beyond 28% of the expected time till first crack is detected. During maintenance of the aircraft such results may be used to decide when a particular landing gear leg should be replaced, with the benefit of increased confidence in the structural integrity of a landing gear and possibly the benefit of enabling landing gear to be in service for longer than is now safely possible.

The criteria for assessing the structural integrity of the landing gear leg 110 will now be briefly discussed in turn with reference to the graphs shown in FIGS. 4 and 5. Whilst various thresholds and numbers are discussed with reference to FIGS. 4 and 5, it will of course be appreciated that FIGS. 4 and 5 correspond to data relating to a specimen test element.

Absolute Cumulative Burst

The cumulative burst count until a crack appears is similar for identical specimens. Thus, a threshold cumulative burst count can be set, over which threshold the landing gear leg should be replaced.

Number of Bursts Over a Range of Different Time Periods and Burst Rate

As can be seen from FIGS. 4 and 5, the gradient of the curve generally increases as the curve gets closer to the instant at which a crack first appears. Thus, a threshold burst rate can be set, over which threshold the landing gear leg should be replaced. It will however be appreciated that the rate can increase to a level comparable to that reached immediately before a crack appears even though the material is not very close to a state in which cracks might appear. For example, consider the gradient of the curves corresponding to test runs 7 and 14. As can be seen more clearly in FIG. 5, the gradient of the latter part of the curve corresponding to test run 7 is almost as steep as the gradient of the curve corresponding to test run 14, even though a crack first appeared during test run 14, and test run 7 might be seen as corresponding to 50% of the maximum possible useable lifetime of the specimen. Thus, advantageously, other criteria are used to reduce the chance of a landing gear leg being withdrawn from service prematurely. Such criteria can include assessing the absolute cumulative burst count in conjunction with the gradient. For example, gradients of the curve at a given level but corresponding to a cumulative burst count being below a threshold cumulative burst count may effectively be ignored, whereas gradients of the curve at the same given level but corresponding to a cumulative burst count above the cumulative burst count threshold may be considered as warranting replacement of the landing gear leg.

The average gradient over a pre-selected interval can also be monitored. It will be seen that curve 14 has a steep gradient that is sustained over a number of bursts over 7000, whereas the steep section of curve 7 last for only about 4000 bursts. Thus, there may be set a threshold average gradient (for example in this case being 0.625 bursts/second) which must be exceeded when measured over a certain number of bursts, for example in this case, 5000 bursts. Line 124 is a line that spans 5000 bursts and which has a gradient of 0.625 bursts/second, whereas line 126 is a line that spans 5000 bursts has a gradient steeper than 0.625 bursts/second. Alternatively, the average gradient may be required to be maintained for a given length of time. For example, an average gradient of greater than 0.93 bursts/second may need to be maintained for at least 2250 seconds. Line 120 is a line that spans 2250 seconds and has a gradient of 0.93 bursts/second, whereas line 122 is a line that spans 2250 seconds and has a gradient steeper than 0.93 bursts/second.

It will of course be appreciated that a number of such criteria can be combined such that the effective test is whether over any given time interval the curve of the number of bursts against time crosses a pre-set boundary. Such a notional boundary is illustrated by the shaded area 128 in FIG. 5. Thus, periodically (at time T, say) the boundary criteria are applied to the curve as would be drawn for the period $T-T_{test}$ until T, where $T_{test}$ is a constant time period of, say, 2000 seconds (the origin of the graph being at the point where $x=T-T_{test}$ and $y=0$). If any part of the curve crosses the boundary into the shaded area 128 the processor will decide that the landing gear leg needs replacing.

Integral of Cumulative Bursts Over Time

Again, the area under the curve of cumulative burst count over time can be monitored and can provide indications of the integrity of the structure of the landing gear leg. The integral over lifetime can be monitored as can the integral over shorter periods of time.

Weighting of Measurements

All of the above methods of monitoring the structural integrity of the landing gear leg rely on counting significant acoustic emissions, irrespective of their location, amplitude, duration or other parameters/characteristics of the acoustic emission. More sophisticated calculations can be made to weight the burst count total in view of one or more parameters or characteristics of the acoustic emission detected. For example, each burst measured could be weighted by the burst peak amplitude. Thus higher energy acoustic emissions (corresponding to comparatively greater change to the internal structure of the landing gear leg) are generally given greater weight than lower energy acoustic emissions. Such weighting could effectively replace, in part at least, the filtering and selecting step performed by the comparator/filter 14, in that acoustic emissions that would previously be discounted as not qualifying as a significant acoustic emission are now accounted but are weighted to have less effect on the analysis carried out.

Separation of Activity of the Aircraft

Because the loading of the landing gear differs significantly according to the activity of the aircraft, the measurements made can either be weighted according to activity or measurements could be made and analysed in groups according to the activity of the aircraft. For example, the landing gear is subjected to loads during taxiing, landing and takeoff. At other times the loading on the landing gear is not significant enough to warrant continued monitoring of acoustic emissions. Giving that loading during landing is greater than during taxiing, the acoustic emissions detected during landing can be given greater weight than during taxiing. Alternatively, separate logs can be made, and/or different rates of data acquisition may be used, for measurements made during taxiing, landing and takeoff, respectively.

Combination of Methods

A variety of different methods for analyzing the acoustic emissions detected are described above and it will be appreciated that a combination of a plurality of such methods may be implemented. The choice of the methods implemented will depend on various factors including the reliability and in particular the statistical validity of the methods actually employed. Such choices can be determined and verified by means of routine experimentation and testing.

In the embodiment described above, the data processed by the comparator/filter 114 is passed to a processor 116 for real-time processing, the results of which being stored in a memory 118. One advantage of such a system is that if, for whatever reason, the processor determines that the structural integrity of the landing gear leg rapidly deteriorates a warning can be made immediately. However, it is also acceptable for the data from the comparator/filter 114 to be processed separately. For example, the measurement system 112 could be provided without the processor 116 and the memory store 120 of previously recorded data for comparison with the measured data. In such a case, the data from the comparator/filter 114 would be simply stored in memory 118 for downloading during maintenance of the aircraft, such that the processing and analysis of the data is performed separately from the aircraft. Such a proposal would reduce complexity of the aircraft processing systems and would also have the capacity to reduce weight slightly.

Whilst the present invention has been described and illustrated with reference to a particular embodiment, it will be appreciated by those of ordinary skill in the art that the invention lends itself to many different variations not specifically illustrated herein. For that reason, reference should be made to the claims for determining the true scope of the present invention. By way of example, certain further variations to the above-described embodiment will now be described.

The peak amplitudes of the acoustic emissions at the source of each acoustic emission may be monitored. The peak amplitude at the source may be calculated by means of ascertaining the location of the source of each acoustic emission. The location of the source may be ascertained by means of triangulation. The general trend of the peak amplitudes of acoustic emissions may be monitored over time. For example, it is thought that the peak amplitudes of acoustic emissions may in certain applications first follow a general upward trend and thereafter decrease following a general downward trend, after which crack initiation occurs. Thus, in an alternative embodiment of the invention, a prediction of imminent crack formation is made when the trend in peak amplitudes of acoustic emissions (the calculated peak amplitude of the acoustic emissions at their respective sources) exceeds a first preset threshold and then subsequently decreases below a second preset threshold. Such a method may in itself be sufficient to make a reasonably accurate prediction of crack initiation.

As an alternative, prediction of crack initiation may be based primarily on monitoring the rate of relevant acoustic emissions. For example, the method may include monitoring the general trend of the change in the rate of relevant acoustic emissions. Thus, in this alternative embodiment of the invention, a prediction of imminent crack initiation is made when the trend in rate of acoustic emissions exceeds a first preset threshold and then subsequently decreases below a second preset threshold.

A further variation comprises monitoring both the rate of acoustic emissions and the cumulative number of acoustic emissions. Once both monitored parameters exceed preset thresholds (or meet other preset criteria) the aircraft component being monitored may be deemed to be in need of urgent replacement.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of measuring the structural integrity of a safe-life aircraft component on an aircraft, the component comprising a load-bearing metal element that is free from cracks, the method comprising the steps of:
converting acoustic emissions generated in the metal element into electronic signals, the acoustic emissions converted including relevant acoustic emissions resulting from changes in the structure of the element that make the element more susceptible to the formation of cracks,
sending the electronic signals to a processing unit,
with the processing unit processing over time the signals in conjunction with stored reference data that allows a measure of the structural integrity to be made from the signals sent to the processing unit, and
outputting information providing a measure of the structural integrity of the aircraft component before any cracks occur;
wherein the step of processing the signals includes performing calculations using a measure of the size of a relevant acoustic emission.

2. A method according to claim 1, wherein the information outputted comprises a prediction concerning the likely occurrence of crack initiation.

3. A method according to claim 2, wherein the prediction comprises an indication of the predicted mean time left before a crack will occur.

4. A method according to claim 1, wherein the step of processing the signals includes calculating the cumulative number of relevant acoustic emissions over a period.

5. A method according to claim 4, wherein the step of processing the signals includes a step of effectively comparing the cumulative number of relevant acoustic emissions with a pre-set threshold.

6. A method according to claim 1, wherein the step of processing the signals includes a step of monitoring the number of relevant acoustic emissions over a pre-set period.

7. A method according to claim 1, wherein the measure of the size of the relevant acoustic emission is a measure of the size of the relevant acoustic emission at the source of the relevant acoustic emission.

8. A method according to claim 1, wherein the measure of the size of the relevant acoustic emission is the peak amplitude of the acoustic emission.

9. A method according to claim 1, wherein the method comprises monitoring the trend of the peak amplitudes of acoustic emissions over time.

10. A method according to claim 1, wherein the method comprises deeming that the structural integrity of the aircraft component is adversely affected once the trend of the peak amplitudes of acoustic emissions has been judged to have met first criteria and to have later met second criteria different from the first criteria.

11. A method according to claim 10, wherein the first criteria are judged to have been met once the trend exceeds a first level and the second criteria are judged to have been met once the trend reduces below a second level.

12. A method according to claim 1, wherein the measure of the size of the relevant acoustic emission is the peak amplitude of the acoustic emission at the source of the relevant acoustic emission.

13. A method according to claim 1, wherein the step of processing the signals includes a step of calculating a characteristic relating to the rate of relevant acoustic emissions.

14. A method according to claim 1, wherein the method comprises monitoring the rate of relevant acoustic emissions and ascertaining a trend of the rate, and deeming that the structural integrity of the aircraft component is adversely affected once the trend of the rate of relevant acoustic emissions has been judged to have met first criteria and to have later met second criteria different from the first criteria.

15. A method according to claim 14, wherein the first criteria are judged to have been met once the trend exceeds a first level and the second criteria are judged to have been met once the trend reduces below a second level.

16. A method according to claim 1, wherein
the step of processing the signals includes a step of calculating a characteristic relating to the rate of relevant acoustic emissions and includes a step of calculating the cumulative number of relevant acoustic emissions over a period, and
the processing unit compares data concerning the characteristic relating to the rate of relevant acoustic emissions and concerning the cumulative number of relevant acoustic emissions over the period with the stored reference data to produce the measure of the structural integrity.

17. A method according to claim 1, wherein
the processing unit ascertains whether both the rate of relevant acoustic emissions exceeds a preset value and the cumulative number of relevant acoustic emissions over the period exceeds a preset value.

18. A method according to claim 1, wherein the step of processing the signals includes a step of weighting a calculated or measured set of data by the size of the relevant acoustic emissions.

19. A method according to claim 1, wherein the step of processing the signals includes taking into account an indication of the proximity of the sources of the respective relevant acoustic emissions relative to each other.

20. A method according to claim 1, wherein the information providing a measure of the structural integrity of the aircraft component comprises an indication whether or not the aircraft component is deemed to be in need of further action.

21. A method according to claim 20, wherein the further action is further non-destructive testing to obtain an assessment of the structural integrity of the aircraft component, such testing not being dependent on the monitoring of acoustic emissions.

22. A method according to claim 21, wherein the method comprises implementing the further action.

23. A method according to claim 20, wherein the further action comprises replacing at least a part of the aircraft component.

24. A method according to claim 23, wherein the method comprises implementing the further action.

25. A method according to claim 1, comprising providing a multiplicity of acoustic emission sensors for effecting the step of converting acoustic emissions generated in the aircraft component into electronic signals.

26. A method according to claim 25, wherein at least two of the acoustic emission sensors have a fundamental resonant frequency at a first frequency and at least two acoustic emission sensors have a fundamental resonant frequency at a second frequency, the first and second frequencies being different.

27. A method according to claim 1, wherein the aircraft component is in the form of a component on an aircraft landing gear.

28. A method of acquiring data for subsequent processing, the data concerning the structural properties of a safe-life aircraft component on an aircraft, the component comprising a load-bearing metal element that is free from cracks, the method comprising:
converting acoustic emissions generated in the metal element into electronic signals, the acoustic emissions converted including relevant acoustic emissions resulting from changes in the structure of the element that make the element more susceptible to the formation of cracks,
assessing which of the electronic signals correspond to relevant acoustic emissions, and
storing the electronic signals that have been assessed as corresponding to relevant acoustic emissions as measurement data in a data storage;
wherein
said assessing comprises assessing which of the electronic signals correspond to acoustic emissions typically resulting from changes of a few microns or less in the structure of the metal element.

29. A processing unit programmed to perform the steps performed by the processing unit according to claim 1.

30. A non-transitory computer readable medium containing therein software that is configured to program a processing unit to perform the steps performed by the processing unit in the method according to claim 1.

31. A non-transitory computer reading medium containing therein reference data for use as the stored reference data as required by the method according to claim 1.

32. A kit of parts, comprising a processing unit and a multiplicity of acoustic emission sensors, the kit of parts being configured to implement the method according to claim 1.

33. A kit of parts according to claim 32, further comprising a computer reference data for use as the stored reference data as required by the method.

34. A kit of parts, comprising a multiplicity of acoustic emission sensors and a data storage unit for the storage of measurement data for subsequent processing, the kits of parts being configured to implement the method according to claim 28.

35. An aircraft, comprising:
a crack-free safe-life aircraft component forming a load-bearing metal element of the aircraft, and
an apparatus for performing the method of claim 1 on the safe-life component, the apparatus comprising a processing unit, a multiplicity of acoustic emission sensors, and a reference data storage,
wherein
the multiplicity of acoustic emission sensors is arranged to convert acoustic emissions generated in the metal element into electronic signals,
the processing unit is arranged to receive electronic signals derived from the signals sent by the acoustic emission sensors,
the reference data storage includes stored reference data that allows a measure of the structural integrity of the aircraft component to be made from the signals sent to the processing unit, and
the processing unit is arranged to process over time the received electronic signals in conjunction with the stored reference data and to output information providing a measure of the structural integrity of the aircraft component.

36. An aircraft, comprising:
a crack-free safe-life aircraft component forming a load-bearing metal element of the aircraft, and
an apparatus for performing the method of claim 28 on the safe-life component, the apparatus comprising a multiplicity of acoustic emission sensors, and a measurement data storage,
wherein
the multiplicity of acoustic emission sensors is arranged to convert acoustic emissions generated in the metal element into electronic signals, and
the measurement data storage is arranged to receive data signals derived from the electronic signals from the acoustic emission sensors and to store those signals as measurement data in the measurement data storage.

37. A non-transitory computer readable medium containing therein software that is configured to program a processing unit to perform the steps performed by the processing unit in the method according to claim 28.

38. A method of measuring the structural integrity of a safe-life aircraft component on an aircraft, the component comprising a load-bearing metal element that is free from cracks, the method comprising the steps of:
converting acoustic emissions generated in the metal element into electronic signals, the acoustic emissions converted including relevant acoustic emissions resulting from changes in the structure of the element that make the element more susceptible to the formation of cracks, sending the electronic signals to a processing unit, with the processing unit processing over time the signals in conjunction with stored reference data that allows a measure of the structural integrity to be made from the signals sent to the processing unit, and outputting information providing a measure of the structural integrity of the aircraft component before any cracks occur;

wherein the method comprises monitoring the rate of relevant acoustic emissions and ascertaining a trend of the rate, and deeming that the structural integrity of the aircraft component is adversely affected once the trend of the rate of relevant acoustic emissions has been judged to have met first criteria and to have later met second criteria different from the first criteria.

39. A method according to claim 38, wherein the first criteria are judged to have been met once the trend exceeds a first level and the second criteria are judged to have been met once the trend reduces below a second level.

40. A non-transitory computer readable medium containing therein software that is configured to program a processing unit to perform the steps performed by the processing unit in the method according to claim 38.

41. An aircraft, comprising:
a crack-free safe-life aircraft component forming a load-bearing metal element of the aircraft, and
an apparatus for performing the method of claim 38 on the safe-life component, the apparatus comprising a processing unit, a multiplicity of acoustic emission sensors, and a reference data storage, wherein
the multiplicity of acoustic emission sensors is arranged to convert acoustic emissions generated in the metal element into electronic signals,
the processing unit is arranged to receive electronic signals derived from the signals sent by the acoustic emission sensors,
the reference data storage includes stored reference data that allows a measure of the structural integrity of the aircraft component to be made from the signals sent to the processing unit, and
the processing unit is arranged to process over time the received electronic signals in conjunction with the stored reference data and to output information providing a measure of the structural integrity of the aircraft component.

42. A method of measuring the structural integrity of a safe-life aircraft component on an aircraft, the component comprising a load-bearing metal element that is free from cracks, the method comprising the steps of:
converting acoustic emissions generated in the metal element into electronic signals, the acoustic emissions converted including relevant acoustic emissions resulting from changes in the structure of the element that make the element more susceptible to the formation of cracks,
sending the electronic signals to a processing unit,
with the processing unit processing over time the signals in conjunction with stored reference data that allows a measure of the structural integrity to be made from the signals sent to the processing unit, and
outputting information providing a measure of the structural integrity of the aircraft component before any cracks occur;
wherein
the step of processing the signals includes a step of calculating a characteristic relating to the rate of relevant acoustic emissions and includes a step of calculating the cumulative number of relevant acoustic emissions over a period, and
the processing unit compares data concerning the characteristic relating to the rate of relevant acoustic emissions and concerning the cumulative number of relevant acoustic emissions over the period with the stored reference data to produce the measure of the structural integrity.

43. A non-transitory computer readable medium containing therein software that is configured to program a processing unit to perform the steps performed by the processing unit in the method according to claim 42.

44. An aircraft, comprising:
a crack-free safe-life aircraft component forming a load-bearing metal element of the aircraft, and
an apparatus for performing the method of claim 42 on the safe-life component, the apparatus comprising a processing unit, a multiplicity of acoustic emission sensors, and a reference data storage, wherein
the multiplicity of acoustic emission sensors is arranged to convert acoustic emissions generated in the metal element into electronic signals,
the processing unit is arranged to receive electronic signals derived from the signals sent by the acoustic emission sensors,
the reference data storage includes stored reference data that allows a measure of the structural integrity of the aircraft component to be made from the signals sent to the processing unit, and
the processing unit is arranged to process over time the received electronic signals in conjunction with the stored reference data and to output information providing a measure of the structural integrity of the aircraft component.

45. A method of measuring the structural integrity of a safe-life aircraft component on an aircraft, the component comprising a load-bearing metal element that is free from cracks, the method comprising the steps of:
converting acoustic emissions generated in the metal element into electronic signals, the acoustic emissions converted including relevant acoustic emissions resulting from changes in the structure of the element that make the element more susceptible to the formation of cracks,
sending the electronic signals to a processing unit,
with the processing unit processing over time the signals in conjunction with stored reference data that allows a measure of the structural integrity to be made from the signals sent to the processing unit, and
outputting information providing a measure of the structural integrity of the aircraft component before any cracks occur;
wherein
the processing unit ascertains whether both the rate of relevant acoustic emissions exceeds a preset value and the cumulative number of relevant acoustic emissions over the period exceeds a preset value.

46. A non-transitory computer readable medium containing therein software that is configured to program a processing unit to perform the steps performed by the processing unit in the method according to claim 45.

47. An aircraft, comprising:
a crack-free safe-life aircraft component forming a load-bearing metal element of the aircraft, and
an apparatus for performing the method of claim 45 on the safe-life component, the apparatus comprising a processing unit, a multiplicity of acoustic emission sensors, and a reference data storage, wherein the multiplicity of acoustic emission sensors is arranged to convert acoustic emissions generated in the metal element into electronic signals, the processing unit is arranged to receive electronic signals derived from the signals sent by the acoustic emission sensors, the reference data storage includes stored reference data that allows a measure of the structural integrity of the aircraft component to be made from the signals sent to the processing unit, and the processing unit is arranged to process over time the received electronic signals in conjunction with the stored reference data and to output information providing a measure of the structural integrity of the aircraft component.

48. A method of measuring the structural integrity of a safe-life aircraft component on an aircraft, the component comprising a load-bearing metal element that is free from cracks, the method comprising the steps of:

converting acoustic emissions generated in the metal element into electronic signals, the acoustic emissions converted including relevant acoustic emissions resulting from changes in the structure of the element that make the element more susceptible to the formation of cracks, sending the electronic signals to a processing unit, with the processing unit processing over time the signals in conjunction with stored reference data that allows a measure of the structural integrity to be made from the signals sent to the processing unit, and outputting information providing a measure of the structural integrity of the aircraft component before any cracks occur;

wherein the step of processing the signals includes a step of weighting a calculated or measured set of data by the size of the relevant acoustic emissions.

49. A method according to claim 48, wherein the size of the relevant acoustic emission is measured at the source of the relevant acoustic emission.

50. A method according to claim 48, wherein the size of the relevant acoustic emission is the peak amplitude of the acoustic emission.

51. A method according to claim 48, wherein the method comprises monitoring the trend of the peak amplitudes of acoustic emissions over time.

52. A method according to claim 48, wherein the method comprises deeming that the structural integrity of the aircraft component is adversely affected once the trend of the peak amplitudes of acoustic emissions has been judged to have met first criteria and to have later met second criteria different from the first criteria.

53. A method according to claim 52, wherein the first criteria are judged to have been met once the trend exceeds a first level and the second criteria are judged to have been met once the trend reduces below a second level.

54. A method according to claim 48, wherein the size of the relevant acoustic emission is the peak amplitude of the acoustic emission at the source of the relevant acoustic emission.

55. A non-transitory computer readable medium containing therein software that is configured to program a processing unit to perform the steps performed by the processing unit in the method according to claim 48.

56. An aircraft, comprising:
a crack-free safe-life aircraft component forming a load-bearing metal element of the aircraft, and
an apparatus for performing the method of claim 48 on the safe-life component, the apparatus comprising a processing unit, a multiplicity of acoustic emission sensors, and a reference data storage, wherein
the multiplicity of acoustic emission sensors is arranged to convert acoustic emissions generated in the metal element into electronic signals,
the processing unit is arranged to receive electronic signals derived from the signals sent by the acoustic emission sensors,
the reference data storage includes stored reference data that allows a measure of the structural integrity of the aircraft component to be made from the signals sent to the processing unit, and
the processing unit is arranged to process over time the received electronic signals in conjunction with the stored reference data and to output information providing a measure of the structural integrity of the aircraft component.

57. A method of measuring the structural integrity of a safe-life aircraft component on an aircraft, the component comprising a load-bearing metal element that is free from cracks, the method comprising the steps of:

converting acoustic emissions generated in the metal element into electronic signals, the acoustic emissions converted including relevant acoustic emissions resulting from changes in the structure of the element that make the element more susceptible to the formation of cracks, sending the electronic signals to a processing unit, with the processing unit processing over time the signals in conjunction with stored reference data that allows a measure of the structural integrity to be made from the signals sent to the processing unit, and outputting information providing a measure of the structural integrity of the aircraft component before any cracks occur;

said method further comprising providing a multiplicity of acoustic emission sensors for effecting the step of converting acoustic emissions generated in the aircraft component into electronic signals;

wherein at least two of the acoustic emission sensors have a fundamental resonant frequency at a first frequency and at least two acoustic emission sensors have a fundamental resonant frequency at a second frequency, the first and second frequencies being different.

58. A non-transitory computer readable medium containing therein software that is configured to program a processing unit to perform the steps performed by the processing unit in the method according to claim 57.

59. An aircraft, comprising:
a crack-free safe-life aircraft component forming a load-bearing metal element of the aircraft, and
an apparatus for performing the method of claim 57 on the safe-life component, the apparatus comprising a processing unit, a multiplicity of acoustic emission sensors, and a reference data storage, wherein
the multiplicity of acoustic emission sensors is arranged to convert acoustic emissions generated in the metal element into electronic signals,
the processing unit is arranged to receive electronic signals derived from the signals sent by the acoustic emission sensors, the reference data storage includes stored reference data that allows a measure of the structural integrity of the aircraft component to be made from the signals sent to the processing unit, and the processing unit is arranged to process over time the received electronic signals in conjunction with the stored reference data and to output information providing a measure of the structural integrity of the aircraft component.

* * * * *